United States Patent
Welsh et al.

(10) Patent No.: US 10,104,238 B2
(45) Date of Patent: Oct. 16, 2018

(54) METHOD AND SYSTEM FOR REPLACING TELEPHONY APPARATUS IN AN IP TELEPHONY NETWORK

(71) Applicant: UNIFIED FX LIMITED, Glasgow (GB)

(72) Inventors: Stephen Welsh, Glasgow (GB); Phil Coll, Gullane (GB); Andrew Smillie, Glasgow (GB)

(73) Assignee: UNIFIED FX LIMITED, Glasgow (GB)

(*) Notice: Subject to any disclaimer, the term of this patent is extended or adjusted under 35 U.S.C. 154(b) by 0 days.

(21) Appl. No.: 15/186,130

(22) Filed: Jun. 17, 2016

(65) Prior Publication Data
US 2016/0295022 A1    Oct. 6, 2016

(51) Int. Cl.
*H04M 7/00*   (2006.01)
*H04M 1/253*  (2006.01)

(52) U.S. Cl.
CPC ........ *H04M 7/0087* (2013.01); *H04M 1/2535* (2013.01); *H04M 7/0075* (2013.01)

(58) Field of Classification Search
CPC ............. H04M 1/2471; H04M 1/2535; H04M 7/0075; H04M 7/0081; H04M 7/0087; H04M 3/42136–3/42178; H04M 3/22; H04M 3/2263; H04L 41/08; H04L 41/0803; H04L 41/0806; H04L 41/0809; H04L 41/0813; H04L 41/082; H04L 41/0823; H04L 41/084–41/0846; H04L 41/0876–41/0886; H04L 41/0889; H04L 67/306; H04L 67/34; G06F 9/445
See application file for complete search history.

(56) References Cited

U.S. PATENT DOCUMENTS

| | | | |
|---|---|---|---|
| 7,689,210 B1* | 3/2010 | Bims | H04B 7/022 370/338 |
| 2010/0279674 A1* | 11/2010 | Zou | H04L 41/5054 455/419 |
| 2011/0047033 A1* | 2/2011 | Mahaffey | G06Q 30/0269 705/14.66 |

OTHER PUBLICATIONS

Cisco Systems, Inc., "Creating Idle URL Using Graphics on Cisco IP Phone", Document ID: 42573, Apr. 6, 2011 (Year: 2011).*

* cited by examiner

*Primary Examiner* — Joshua Kading
(74) *Attorney, Agent, or Firm* — Liu & Liu

(57) ABSTRACT

The present invention relates to a method of replacing at a first location in a telephony network first telephony apparatus comprising apparatus data with second telephony apparatus. The method comprises receiving at a second location in the telephony network remote from the first location identification data for the first telephony apparatus, the identification data providing for identification of the first telephony apparatus from among plural telephony apparatus in the telephony network. The method also comprises acquiring apparatus data for the first telephony apparatus from a data structure in dependence on the identification data, the data structure comprising the identification data and the apparatus data. The method further comprises replacing in the telephony network the first telephony apparatus with the second telephony apparatus. The method yet further comprises conveying the acquired apparatus data from the second location to the second telephony apparatus by way of the telephony network.

17 Claims, 3 Drawing Sheets

METHOD AND SYSTEM FOR REPLACING TELEPHONY APPARATUS IN AN IP TELEPHONY NETWORK

FIELD OF THE INVENTION

The present invention relates to a method of replacing telephony apparatus in a telephony network comprising plural telephony apparatus and in particular but not exclusively replacing each of plural telephony apparatus in a telephony network distributed over plural locations. The present invention also relates to a telephony network comprising plural telephony apparatus configured for replacement of telephony apparatus and in particular but not exclusively for replacement of each of plural telephony apparatus in a telephony network distributed over plural locations.

BACKGROUND ART

Telephones in a telephony network are replaced periodically. Typically this involves replacement of at least a substantial proportion of the telephones in the telephony network. Often all of the telephones in the telephony network are replaced and perhaps on a phased basis.

Known approaches to replacing telephones in a telephony network usually involve collecting MAC addresses for the telephones to be replaced, sending of specific replacement telephones to specific users, the presence of an engineer at each location where a telephone is being replaced and manipulating and importing files to the telephony network communications manager.

A telephony network may comprise from a modest number of telephones to a considerable number of telephones of the order of hundreds of telephones and sometimes more. Replacing telephones in a large telephony network therefore typically requires considerable planning, time and effort. However planning, time and effort is still required even in a telephony network comprising a modest number of telephones, in particular where the telephony network is distributed over plural sites.

The present inventors have become appreciative of the planning, time and effort involved in replacing telephones in a telephony network. The present invention has been devised in light of this appreciation. It is therefore an object for the present invention to provide an improved method of replacing telephony apparatus in a telephony network comprising plural telephony apparatus and in particular replacing each of plural telephony apparatus in the telephony network. It is a further object for the present invention to provide a telephony network comprising plural telephony apparatus configured for replacement of telephony apparatus and in particular for replacement of each of plural telephony apparatus in the telephony network.

Statement of Invention

According to a first aspect of the present invention there is provided a method of replacing at a first location in a telephony network first telephony apparatus comprising apparatus data with second telephony apparatus, the method comprising:

receiving at a second location in the telephony network remote from the first location identification data for the first telephony apparatus, the identification data providing for identification of the first telephony apparatus from among plural telephony apparatus in the telephony network;

acquiring apparatus data for the first telephony apparatus from a data structure in dependence on the identification data, the data structure comprising the identification data and the apparatus data;

replacing in the telephony network the first telephony apparatus with the second telephony apparatus; and conveying the acquired apparatus data from the second location to the second telephony apparatus by way of the telephony network.

The method according to the present invention relates to replacing at a first location in a telephony network first telephony apparatus comprising apparatus data with second telephony apparatus whereby the apparatus data is stored in the second telephony apparatus. The first and second telephony apparatus may be from the same vendor or from different vendors. The method comprises receiving at a second location in the telephony network remote from the first location identification data for the first telephony apparatus. The telephony network may therefore be distributed over plural locations. The identification data provides for identification of the first telephony apparatus from among plural telephony apparatus in the telephony network. The method further comprises acquiring apparatus data for the first telephony apparatus from a data structure in dependence on the identification data. The data structure comprises the identification data and the apparatus data and may, for example, be at the second location. The method yet further comprises replacing in the telephony network the first telephony apparatus with the second telephony apparatus. When the first telephony apparatus has been replaced with the second telephony apparatus the method comprises conveying the acquired apparatus data from the second location to the second telephony apparatus by way of the telephony network.

In known approaches to replacing telephones, specific replacement telephones are sent to specific users and an engineer is required to be present at a location where a telephone is being replaced. According to the present invention, apparatus data for the telephony apparatus being replaced is acquired from a data structure and the apparatus data is conveyed to the replacement telephony apparatus by way of the telephony network. This may obviate the need for an engineer to be present at the location of the replacement. Furthermore the apparatus data for the telephony apparatus being replaced may suffice to configure the replacement telephony apparatus for use and thereby obviate the need to send a specific replacement telephone to the replacement location.

The data structure may be configured to provide the apparatus data in dependence on receipt of the identification data. When addressed by the identification data the data structure may return the apparatus data. The data structure may be configured such that the identification data and the apparatus data are associated with each other.

The present invention may be of particular advantage when each of plural telephony apparatus in the telephony network is being replaced. Therefore identification data for each of the first telephony apparatus may be received at the second location in the telephony network. Each of the plural identification data may provide for identification of the respective first telephony apparatus from among the plural telephony apparatus in the telephony network. The data structure may comprise plural different identification data and plural apparatus data, each of the plural different identification data corresponding to a different one of the plural apparatus data. The data structure may have the form of a look-up table (LUT).

Prior to replacement of telephony apparatus the data structure may be configured such that it comprises apparatus data and identification data. The method may therefore comprise receiving identification data and apparatus data from first telephone apparatus and more specifically from each of plural first telephone apparatus. The identification data and apparatus data may be received at a location remote from the first telephone apparatus. The identification data and apparatus data may be conveyed by way of the telephony network. When the identification data and apparatus data are received at the remote location the data structure may be configured accordingly. Identification data and apparatus data may be received at plural spaced apart times and perhaps at regular intervals. The data structure may thus be kept up to date such that changes to the telephony network such as in respect of apparatus data are accommodated. Manipulation and importing of files to a telephony network communications manager according to known approaches may therefore not be required.

Identification data and apparatus data may be received in respect of all of plural telephony apparatus comprised in the telephony network. Alternatively or in addition identification data and apparatus data may be received in respect of some of plural telephony apparatus comprised in the telephony network. More specifically identification data and apparatus data may be received in respect of telephony apparatus which has been changed in or added to the telephony network. Receipt identification data and apparatus data in respect of all of plural telephony apparatus may take place less frequently than receipt of identification data and apparatus data in respect of some of plural telephony apparatus. For example receipt of identification data and apparatus data in respect of all of plural telephony apparatus may take place at 30 minute intervals and receipt of identification data and apparatus data in respect of some of plural telephony apparatus may take place at 1 minute intervals.

The apparatus data may comprise device data. More specifically the device data may comprise at least one of: telephone services; telephone button template; softkey template; device defaults; device profile; recording profile; device description; device directory number; device location; device region; and device owner. The apparatus data may comprise user data. More specifically the user data may comprise at least one of: speed dials; contacts; user information; user identification; and user directory number. In forms of the invention the apparatus data comprises the substantially entire configuration data for the first telephony apparatus.

The step of receiving identification data for the first telephony apparatus may comprise conveying the identification data from the first location to the second location. The identification data may be conveyed by way of the telephony network. Alternatively the identification data may be conveyed by way of a communication channel other than the telephony network.

The identification data may comprise switch port data. The switch port data may identify uniquely within the telephony network the switch port to which the first telephony apparatus is connected.

The identification data may be conveyed from the first location to the second location in dependence on connection of the second telephony apparatus to the telephony network. Connection of the second telephony apparatus to the telephony network may initiate a request of the second telephony apparatus to convey the identification data to the second location. More specifically the second telephony apparatus may be configured to address by way of the telephony network a program at the second location which when addressed requests by way of the telephony network the second telephony apparatus to convey the identification data by way of the telephony network. The second telephony apparatus may be configured to address the program at the second location by way of an idle URL comprised in the second telephony apparatus.

The identification data may be conveyed from the first location to the second location in dependence on user operation. According to a first approach, the identification data may be conveyed from the first location to the second location in dependence on user operation of the telephony apparatus and more specifically of the second telephony apparatus. For example the user may log in to the telephony apparatus and thereafter initiate transfer of the identification data to the second location by way of the telephony network. The telephony apparatus may store an address for a program at the second location and user operation of the telephony apparatus may transfer the identification data to the program in dependence on the stored address. More specifically the user may enter his or her username to initiate transfer of the identification data to the second location. The identification data may be the username.

According to a second approach, the identification data may be conveyed from the first location to the second location in dependence on user operation of apparatus apart from the telephony apparatus whereby the identification data is conveyed by a communication channel other than the telephony network. More specifically the other communication channel may comprise a mobile telephony network such as by way of the Global System for Mobile Communications (GSM) network. The apparatus apart from the telephony apparatus may comprise a mobile telephone. The apparatus apart from the telephony apparatus may be configured for entry of identification data by the user, such as entry of an extension number for the telephony apparatus or another unique identifier for the user. Alternatively or in addition the method may further comprise acquiring the identification data from the telephony apparatus by way of the apparatus apart from the telephony apparatus before the identification data is conveyed to the second location from the apparatus apart from the telephony apparatus. The identification data may be acquired from the telephony apparatus in dependence on user operation of the apparatus apart from the telephony apparatus. The identification data may be acquired from the telephony apparatus by the apparatus apart from the telephony apparatus by way of a wireless communication channel between the telephony apparatus and the apparatus apart from the telephony apparatus. According to an approach, the telephony apparatus may display data corresponding to the identification data, such as in the form of a QR code, and the apparatus apart from the telephony apparatus may be operative to acquire an image of the displayed data. The data may be displayed on a display comprised in the telephony apparatus. More specifically the apparatus apart from the telephony apparatus may be operative to acquire the image by way of a camera comprised in the apparatus apart from the telephony apparatus. Where the apparatus apart from the telephony apparatus is a mobile telephone the mobile telephone may be operative to run an App. The App may provide for operation as described hereinabove.

The identification data may be conveyed from the first location to the second location without being in dependence on operation at the first location whether connection of the second telephony apparatus to the telephony network or user operation at the first location. The method may therefore comprise polling telephony apparatus comprised in the telephony network to identify replacement telephony apparatus. Upon identification of replacement telephony apparatus, identification data may be conveyed to the second location. Polling of telephony apparatus comprised in the telephony network may be on a regular basis. Alternatively or in addition, polling may be on an irregular basis, for example, when another approach to initiating transfer of the identification data has failed. Replacement telephony apparatus may be identified when the identification data is the same but the device identifier has changed. The identification data may be the extension number.

The method may comprise taking one approach to conveying identification data from the first location to the second location in preference to another approach before the other approach is taken. For example the method may comprise conveying the identification data from the first location to the second location in dependence on connection of the second telephony apparatus to the telephony network. If this approach fails, the method may then comprise conveying the identification data from the first location to the second location in dependence on user operation.

At least one of the first and second telephony apparatus may be a landline telephone and more specifically a digital telephone. The telephony apparatus may be configured for Internet telephony. The telephony apparatus may therefore comprise a microprocessor for controlling operation of the telephony apparatus. The telephony apparatus may comprise digital memory which is configured, for example, to store apparatus data for the telephony apparatus. The telephony apparatus may be configured to provide a web-browser which is operative, for example, on the basis of XML.

According to a second aspect of the present invention there is provided a computer program comprising instructions for causing a computer to perform the method according to the first aspect of the present invention.

The computer program may be at least one of: embodied on a record medium; embodied in read only memory; stored in computer memory; and carried on an electrical carrier signal. The computer program may be stored in a non-transitory medium for storing data for access by an application program being executed in the telephony network and more specifically on a server comprised in the telephony network.

Further embodiments of the second aspect of the present invention may comprise one or more features of the first aspect of the present invention.

According to a third aspect of the present invention there is provided a computer system comprising program instructions for causing a computer and more specifically a server comprised in the telephony network to perform the method according to the first aspect of the present invention.

The program instructions may be at least one of: embodied on a record medium; embodied in read only memory; stored in computer memory; and carried on an electrical carrier signal. The program instructions may be stored in a non-transitory medium for storing data for access by an application program being executed in the telephony network and more specifically on a server comprised in the telephony.

Further embodiments of the third aspect of the present invention may comprise one or more features of the first aspect of the present invention.

According to a fourth aspect of the present invention there is provided a telephony network comprising plural telephony apparatus and a data structure comprising identification data and apparatus data for the telephony apparatus, the telephony network being configured to receive identification data for first telephony apparatus which is being replaced at a first location in the telephony network, the identification data providing for identification of the first telephony apparatus from among the plural telephony apparatus and being received at a second location remote from the first location, the telephony network being further configured: to acquire apparatus data for the first telephony apparatus from the data structure in dependence on the received identification data; and to convey the acquired apparatus data from the second location to second telephony apparatus by way of the telephony network following replacement of the first telephony apparatus with the second telephony apparatus.

Embodiments of the fourth aspect of the present invention may comprise one or more features of the first aspect of the present invention.

The present inventors have appreciated the present invention to be of wider applicability than to telephony apparatus. The approach may, for example, be applied to replacement of the like of Personal Computers or smart meters in a computer network. Therefore and according to a fifth aspect of the present invention there is provided a method of replacing at a first location in a computer network first apparatus comprising apparatus data with second apparatus, the method comprising: receiving at a second location in the computer network remote from the first location identification data for the first apparatus, the identification data providing for identification of the first apparatus from among plural apparatus in the computer network; acquiring apparatus data for the first apparatus from a data structure in dependence on the identification data, the data structure comprising the identification data and the apparatus data; replacing in the computer network the first apparatus with the second apparatus; and conveying the acquired apparatus data from the second location to the second apparatus by way of the computer network.

The first and second apparatus may be configured to perform substantially the same essential function. Transferring the apparatus data from the first apparatus to the second apparatus may therefore be of value for operation of the second apparatus when the second apparatus has replaced the first apparatus. Each of the first and second apparatus may be configured to provide a service to a user at the first location. More specifically each of plural apparatus in the computer network may be configured to provide a service to a different user at a respective location.

Further embodiments of the fifth aspect of the present invention may comprise one or more features of the first aspect of the present invention.

BRIEF DESCRIPTION OF DRAWINGS

Further features and advantages of the present invention will become apparent from the following specific description, which is given by way of example only and with reference to the accompanying drawings, in which.

DESCRIPTION OF EMBODIMENTS

Figure 1:
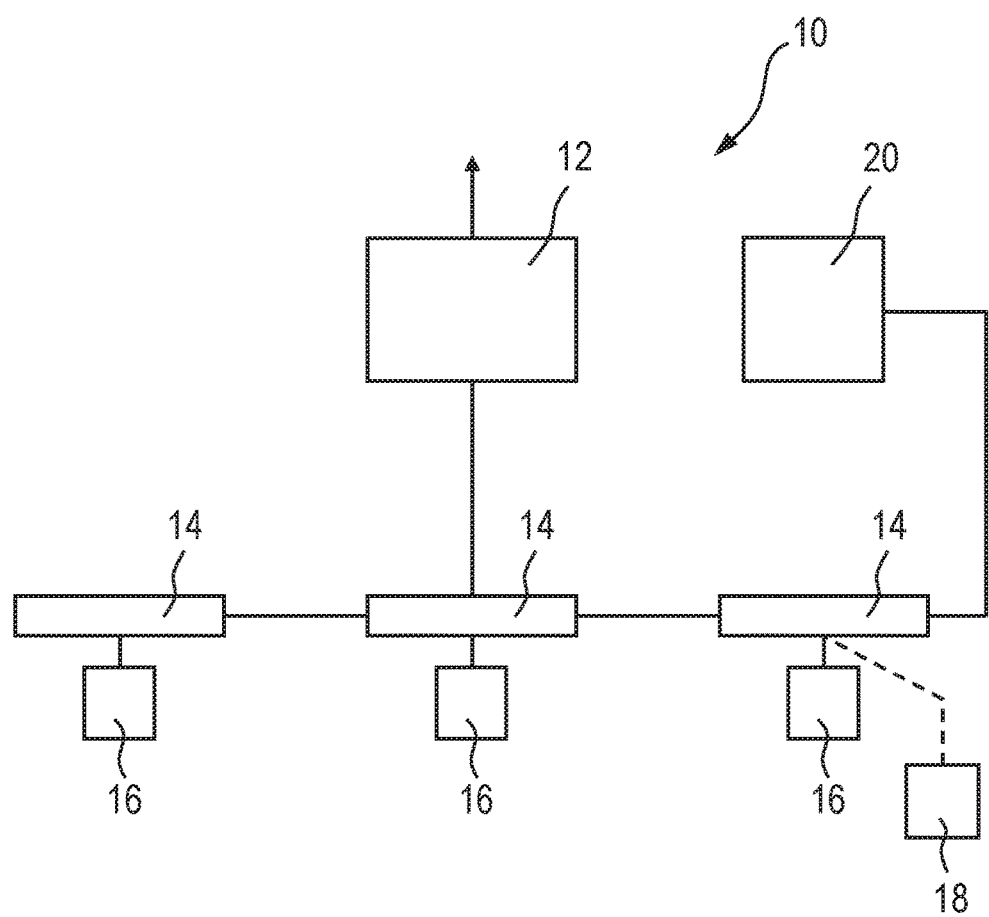
FIG. 1 is a block diagram of a telephony network according to an embodiment of the present invention.

A block diagram of a telephony network 10 according to an embodiment of the present invention is shown in FIG. 1. The telephony network 10 comprises a telephony network communications manager 12 which is hosted on a server of conventional form and function. The telephony network 10 further comprises plural switches 14 at different spaced apart locations which are in data communication with the telephony network communications manager 12. An Internet Protocol (IP) telephone 16 is connected by way of an electrical cable to each switch 14. Although only a few pairs of switches 14 and IP telephones 16 are shown in FIG. 1, in practice a telephony network 10 will comprise many more such pairs of switches 14 and IP telephones 16. The telephony network 10 is configured in a conventional fashion such that a user of one of the IP telephones 16 may contact a user of another one of the IP telephones 16 or contact another person using telephony apparatus outside the telephony network 10. FIG. 1 also shows a replacement IP telephone 18 which is to replace one of the IP telephones 16 already connected to the telephony network 10. FIG. 1 further shows a telephone migration manager 20 which is hosted on a server of conventional form and function. The telephone migration manager 20 is in data communication with the switches 14, the telephony network communications manager 12 and the IP telephones 16.

Figure 2A:
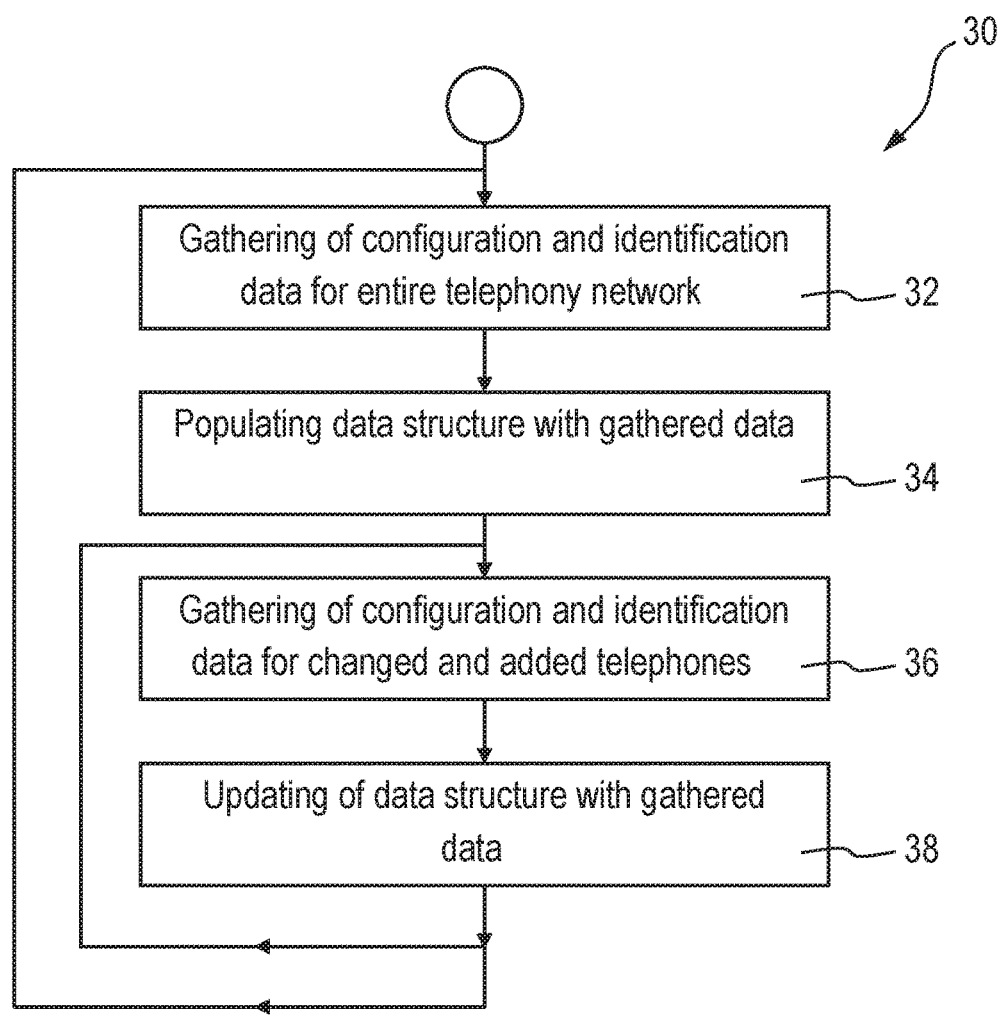
FIG. 2A is a flow chart representation of configuration of a data structure according to an embodiment of the present invention.

A flow chart representation 30 of configuration of a data structure according to an embodiment of the present invention is shown in FIG. 2A. A management program running on the telephone migration manager 20, such as Cisco Discovery Protocol (CDP) or Link Layer Discovery Protocol (LLDP), is operative to gather configuration data from each IP telephone 16 in the telephony network 10 on a regular basis, such as every 30 minutes 32. The plural configuration data is stored in a data structure comprised in the telephone migration manager 20, 34. The configuration data for each IP telephone 16 comprises device data and user data for the IP telephone 16. The management program gathers identification data from each IP telephone 16 in the telephony network 10 at the same time as the configuration data 32. The identification data comprises switch port data which identifies uniquely within the telephony network 10 the switch port to which the telephony apparatus in question is connected. The identification data thus serves for unique identification of an IP telephone 16 within the telephony network 10. Each item of gathered identification data is stored in the data structure with its respective configuration data whereby the data structure is operative as a look up table (LUT) 34. Configuration data for a particular IP telephone 16 may be recovered from the LUT by addressing the LUT with the identification data for the particular IP telephone 16.

Configuration of the data structure further comprises updating the data structure formed as described immediately above to take account of IP telephones 16 which have been changed in or added to the telephony network 10. More specifically, configuration data and identification data for changed or added IP telephones 16 are gathered from the telephony network 10, 36 such as by way of Cisco Unified Communications Manager (CUCM), and the data structure is updated to accommodate the gathered configuration data and identification data 38. Updating of the data structure takes place more frequently than entire configuration of the data structure. For example, updating the data structure takes place at one minute intervals.

Figure 2B:
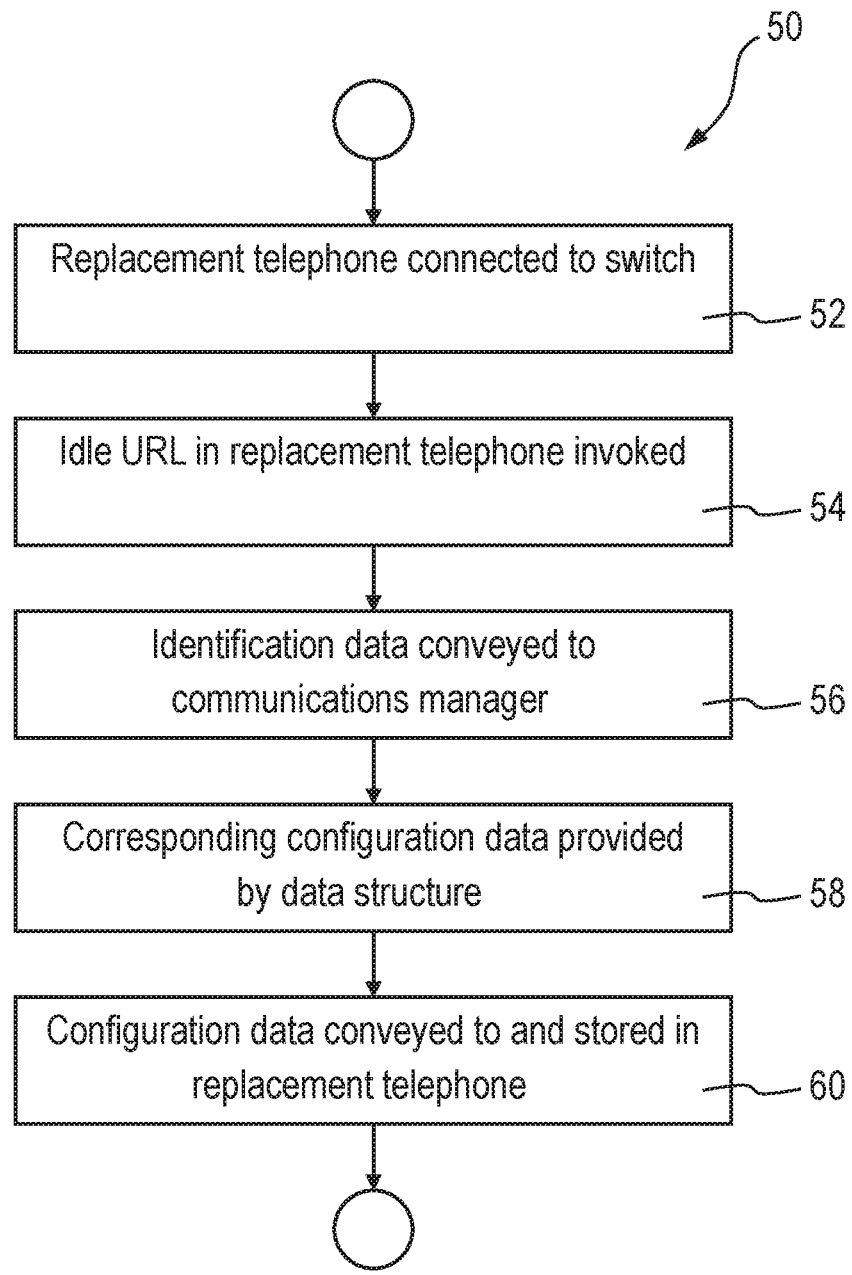
FIG. 2B is a flow chart representation of replacement of a telephone within the telephony network of FIG. 1 according to an embodiment of the present invention.

A flow chart representation 50 of replacement of a telephone within the telephony network of FIG. 1 according to an embodiment of the present invention is shown in FIG. 2B. As described above with reference to FIG. 2A a data structure in the form of a LUT is formed, stored in the telephone migration manager 20 and updated on a regular basis. The data structure therefore contains current pairs of configuration data and identification data with each pair of configuration data and identification data being in respect of a different one of the IP telephones 16 in the telephony network 10. Replacement begins with the user unplugging the electrical cable from the current IP telephone 16 and plugging the electrical cable into the replacement IP telephone 18 whereby the replacement IP telephone is electrically connected to the switch 14, 52. The idle URL of the replacement IP telephone 18 addresses a configuration data transfer program running on the telephone migration manager 20. The idle URL is configured to address the configuration data transfer program before the replacement IP telephone 18 is distributed to the user. After the replacement IP telephone 18 is connected to the switch 14 the idle URL is invoked automatically by the replacement IP telephone 54 whereby the configuration data transfer program is prompted to request the replacement IP telephone 18 to convey identification data in the form of the switch port data to the telephone migration manager 20, 56. Upon receipt of the switch port data, the configuration data transfer program is operative to address the data structure with the received identification data to thereby provide the corresponding configuration data stored in the data structure 58. Before proceeding further, the user is prompted by way of the replacement IP telephone 18 as to whether or not he or she wishes to proceed. If the user indicates his or her wish to proceed by operation of the replacement IP telephone 18 the configuration data transfer program is operative to convey the corresponding configuration data over the telephony network to the replacement IP telephone 18 where it is uploaded and stored 60. The configuration data for a current IP telephone 16 is thus transferred to a replacement IP telephone 18.

According to a second embodiment, identification data is conveyed to the telephone migration manager 20 in dependence on user operation. In this embodiment, the user operates his or her mobile telephone, which is running a dedicated App, whereby the identification data is conveyed to the telephone migration manager 20 over a mobile telephony network such as the Global System for Mobile Communications (GSM) network. According to one approach, the user enters identification data into the mobile telephone and the App is operative to provide for transmission of the entered identification data to the telephone migration manager 20. The identification data is the like of an extension number for the current/replacement IP telephone 16, 18 or a unique identifier for the user of the current/replacement IP telephone 16, 18. In this approach the identification data contained in data structure is obtained not by interrogation of IP telephones 16 but by way of the like of a data file which has been populated with identification data collated from users of the telephony network 10. According to another approach, the identification data is displayed in the form of a QR code on the display of the current IP telephone 16 and the user operates his or her mobile telephone to acquire an image of the QR code by way of a camera comprised in the mobile telephone. The App is then operative to extract the identification data from the image of the QR code and to provide for transmission of the extracted identification data to the telephone migration manager 20.

According to a third embodiment, identification data is conveyed to the telephone migration manager 20 in dependence on user operation. In this embodiment, the user logs in to the replacement IP telephone 18 and enters identification data in the form of his or her username. Thereafter the replacement IP telephone 18 is operative to transfer the username to the telephone migration manager 20 whereupon the corresponding configuration data is returned to the replacement IP telephone from the data structure.

According to a fourth embodiment, the telephone migration manager 20 is operative to poll IP telephones comprised in the telephony network 10 to identify replaced telephony apparatus. In one form, polling is on a regular basis. In another form, polling takes place following failure of another approach to initiating transfer of the identification data. Replaced telephony apparatus is identified in respect of a particular extension number when the device identifier changes. When a replacement IP telephone is identified, its location is determined, such as in respect of the switch port or the extension number, and the location data is operative as identification data to return corresponding configuration data from the data structure to the replacement IP telephone.

The method according to the present invention proceeds as described above with reference to FIG. 2B. If the method described above with reference to FIG. 2B fails to return corresponding configuration data from the data structure in dependence on operation of the idle URL within a predetermined period such as 10 seconds, the method proceeds in accordance with the second, third or fourth embodiment described above.

The invention claimed is:

1. A method of configuring in an IP telephony network a second telephony apparatus replacing a first telephony apparatus, the IP telephony network comprising plural switches at respective spaced apart locations, plural landline telephony apparatuses and a server remote from the plural landline telephony apparatuses, each of the plural switches being uniquely identified within the IP telephony network by way of respective switch port data, each of the plural landline telephony apparatuses comprising digital memory storing respective apparatus data and being connected by way of an electrical cable to a respective one of the plural switches, the first telephony apparatus being one of the plural landline telephony apparatuses and being connected to a first switch of the plural switches, the server storing a data structure comprising paired switch port data and apparatus data for each of the plural landline telephony apparatuses, the method comprising:

receiving in the server switch port data for the first switch in dependence on connection of the second telephony apparatus to the first switch and disconnection of the first telephony apparatus from the first switch;

the server retrieving the apparatus data for the first telephony apparatus from the data structure using the switch port data for the first switch;

the server conveying the apparatus data retrieved from the data structure to the second telephony apparatus by way of the IP telephony network; and storing the apparatus data received from the server in a digital memory comprised in the second telephony apparatus.

2. The method according to claim 1 further comprising, and before the step of receiving in the server switch port data for the first switch, receiving in the server by way of the IP telephony network the pair of switch port data and apparatus data from each of the plural landline telephony apparatuses, the pair of switch port data and apparatus data for each of the plural landline telephony apparatuses then being stored in the data structure.

3. The method according to claim 2 in which the pair of switch port data and apparatus data received in the server from each of the plural landline telephony apparatuses is received repeatedly in the server at plural spaced apart times.

4. The method according to claim 2 in which the pair of switch port data and apparatus data received in the server from each of the plural landline telephony apparatuses is received repeatedly in the server at first intervals and further comprising receiving in the server and storing in the data structure the pair of switch port data and apparatus data at each of second intervals in respect of a respective subset of one or more of the plural landline telephony apparatuses which have been changed in or added to the IP telephony network, the first interval being longer than the second interval.

5. The method according to claim 1 in which the apparatus data comprised in the first telephony apparatus comprises telephony device data.

6. The method according to claim 5 in which the telephony device data comprises at least one of: telephone services; telephone button template; softkey template; device defaults; device profile; recording profile; device description; device directory number; device location; device region; and device owner.

7. The method according to claim 1 in which the apparatus data comprised in the first telephony apparatus comprises user data.

8. The method according to claim 7 in which the user data comprises at least one of: speed dials; contacts; user information; user identification; and user directory number.

9. The method according to claim 1 in which the step of receiving in the server switch port data for the first switch comprises conveying the switch port data from the first switch to the server by way of the IP telephony network.

10. The method according to claim 1 in which the switch port data is conveyed by way of the IP telephony network from the first switch to the server in dependence on connection of the second telephony apparatus to the first switch, connection of the second telephony apparatus to the first switch initiating a request of the second telephony apparatus to convey the switch port data to the server.

11. The method according to claim 10 in which the second telephony apparatus is configured to address by way of the IP telephony network a program at the server, the program when addressed requests by way of the IP telephony network the second telephony apparatus to convey the switch port data to the server by way of the IP telephony network.

12. The method according to claim 11 in which the second telephony apparatus is configured to address the program at the server by way of an idle URL comprised in the second telephony apparatus.

13. The method according to claim 12 in which the second telephony apparatus is configured to invoke the idle URL automatically in dependence on connection of the second telephony apparatus to the IP telephony network by way of the electrical cable.

14. The method according to claim 11 in which the program at the server addresses the data structure with the switch port data received from the second telephony apparatus to thereby retrieve the paired apparatus data from the data structure.

15. The method according to claim 14 in which the program at the server conveys the paired apparatus data retrieved from the data structure to the second telephony apparatus by way of the IP telephony network.

16. A computer program stored in a non-transitory medium, the computer program comprising instructions for causing a computer to perform the method according to claim 1.

17. An IP telephony network comprising plural switches at respective spaced apart locations, plural landline telephony apparatuses and a server remote from the plural landline telephony apparatuses, each of the plural switches being uniquely identified within the IP telephony network by way of respective switch port data, each of the plural landline telephony apparatuses comprising digital memory storing respective apparatus data and being connected by way of an electrical cable to a respective one of the plural switches, a first telephony apparatus being one of the plural landline telephony apparatuses and being connected to a first switch of the plural switches, the server storing a data structure comprising paired switch port data and apparatus data for each of the plural landline telephony apparatuses, the server in the IP telephony network being configured to receive switch port data for the first switch in dependence on disconnection of the first telephony apparatus from the first switch and connection of second telephony apparatus to the first switch by way of an electrical cable, the server in the IP telephony network being further configured: to retrieve the apparatus data for the first telephony apparatus from the data structure by way of a program running on the server using the switch port data for the first switch; and to convey from the server by way of the program running on the server the apparatus data retrieved from the data structure to the second telephony apparatus by way of the IP telephony network, and the second telephony apparatus storing the apparatus data received from the server in a digital memory comprised in the second telephony apparatus.

* * * * *